(12) United States Patent
Pruetz

(10) Patent No.: US 11,016,112 B2
(45) Date of Patent: May 25, 2021

(54) INERTIAL SENSOR FOR MEASURING A RATE OF ROTATION AND/OR ACCELERATION

(71) Applicant: Robert Bosch GmbH, Stuttgart (DE)

(72) Inventor: Odd-Axel Pruetz, Nuertingen (DE)

(73) Assignee: Robert Bosch GmbH, Stuttgart (DE)

( * ) Notice: Subject to any disclaimer, the term of this patent is extended or adjusted under 35 U.S.C. 154(b) by 305 days.

(21) Appl. No.: 16/308,875

(22) PCT Filed: Jun. 22, 2017

(86) PCT No.: PCT/EP2017/065473
§ 371 (c)(1),
(2) Date: Dec. 11, 2018

(87) PCT Pub. No.: WO2018/001875
PCT Pub. Date: Jan. 4, 2018

(65) Prior Publication Data
US 2020/0309806 A1    Oct. 1, 2020

(30) Foreign Application Priority Data

Jun. 30, 2016   (DE) .......................... 102016211984.2

(51) Int. Cl.
*G01P 3/44*     (2006.01)
*G01P 1/00*     (2006.01)
*G01P 15/08*    (2006.01)

(52) U.S. Cl.
CPC ................. *G01P 3/44* (2013.01); *G01P 1/00* (2013.01); *G01P 15/08* (2013.01)

(58) Field of Classification Search
CPC .................................................. G01C 19/574
See application file for complete search history.

(56) References Cited

U.S. PATENT DOCUMENTS 6,349,597 B1 *   2/2002   Folkmer ............ G01C 19/5712
                                                          73/504.02
8,453,504 B1     6/2013   Mao
                     (Continued)

FOREIGN PATENT DOCUMENTS

DE          19530007 A1     2/1997

OTHER PUBLICATIONS

International Search Report for PCT/EP2017/065473, dated Oct. 4, 2017.

*Primary Examiner* — Paul M. West
*Assistant Examiner* — Mark A Shabman
(74) *Attorney, Agent, or Firm* — Norton Rose Fulbright US LLP; Gerard Messina

(57) ABSTRACT

A microelectromechanical inertial sensor to measure a rate of rotation and/or acceleration, the inertial sensor having a substrate, at least two deflectable masses coupled mechanically to the substrate, and at least one detector detecting movements of the masses along a first direction, the masses being mechanically coupled to one another by at least one first, second, and third coupling element, the coupling elements being configured so that when there is a deflection of the masses from the rest position a pivoting of a first main direction of extension of the first coupling element relative to a second main direction of extension of the second coupling element takes place and a pivoting of the second main direction of extension relative to the third main direction of extension of the third coupling element takes place, and the coupling elements being coupled mechanically to the substrate via at least one substrate connecting point.

10 Claims, 8 Drawing Sheets

(56) References Cited

U.S. PATENT DOCUMENTS

2005/0072231 A1     4/2005   Chojnacki et al.
2010/0281977 A1*   11/2010   Coronato ........... G01C 19/5747
                                                                         73/504.14
2011/0154898 A1*    6/2011   Cazzaniga ......... G01C 19/5747
                                                                         73/504.12

* cited by examiner

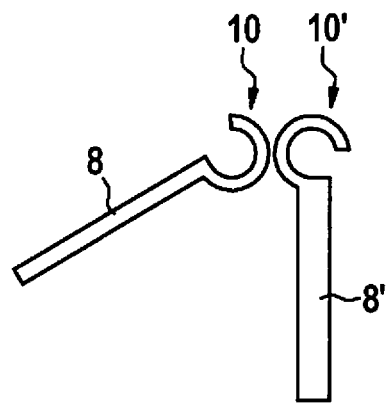
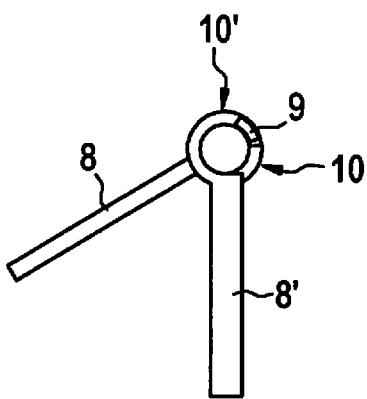
Fig. 12a        Fig. 12b
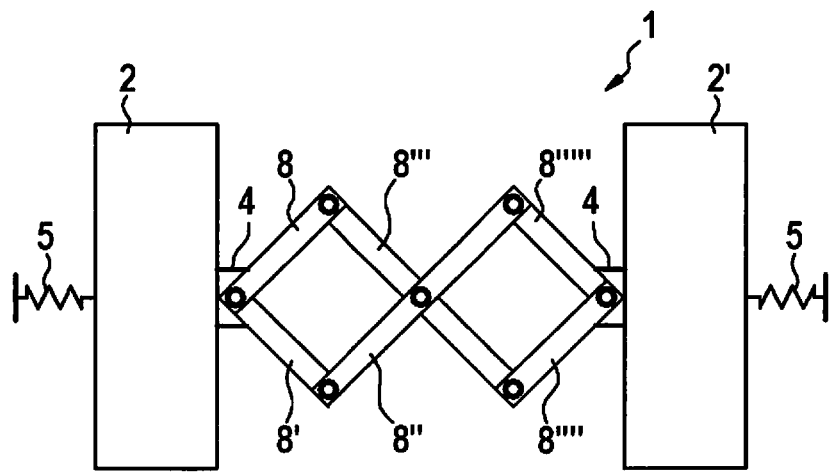
Fig. 13

INERTIAL SENSOR FOR MEASURING A RATE OF ROTATION AND/OR ACCELERATION

FIELD

The present invention relates to an inertial sensor.

BACKGROUND INFORMATION

Conventional inertial sensors are used to measure an acceleration or a rate of rotation with regard to one or more axes parallel or perpendicular to the main plane of extension of the substrate. Such inertial sensors are standardly made up of a plurality of movable masses that are mechanically coupled to one another. The type of coupling is critical, because it determines the signal quality, and suppresses interference signals more or less well.

SUMMARY

An object of the present invention is to provide an inertial sensor that has a simple design compared to conventional inertial sensors, largely suppresses interference signals, in particular parallel to the main plane of extension, and can be used both for the detection of a rate of rotation and/or an acceleration both parallel and perpendicular to the main plane of extension.

Compared to the existing art, the inertial sensor according to the present invention may have the advantage that the inertial sensor can be used flexibly, in particular for the detection of a rate of rotation and/or an acceleration both parallel and perpendicular to the main plane of extension, has a simple design, and in particular is not sensitive to interference signals caused by parallel interference modes. Compared to the existing art, the inertial sensor according to the present invention advantageously may also have masses that are less inert, which also has an advantageous effect on possible interference signals. In addition, due to at least one substrate connecting point the inertial sensor is advantageously insensitive to stress; i.e., the inertial sensor is not sensitive to bending of the substrate about an axis perpendicular to the main plane of extension.

Preferably, the inertial sensor is realized as a microsystem, in particular a microelectromechanical system (MEMS). Particularly preferably, the inertial sensor is a one-axis inertial sensor, i.e., is provided for the detection of a rate of rotation about exactly one axis, or for the detection of acceleration along exactly one axis. Quite particularly preferably, the substrate is made of a semiconductor material, in particular a silicon material. The main direction of extension is in particular parallel to a surface of the substrate. Preferably, the coupling elements together form a coupling structure. Thus, when a coupling structure is discussed hereinafter, preferably the totality and/or configuration of the coupling elements is meant thereby.

In the sense of the present application, a pivoting is to be understood in particular as a relative rotation. Two elements pivoted relative to one another should preferably enclose an actual or virtual angle, the size of the angle changing in the course of the movement, i.e., the pivoting.

Preferably it is provided that the coupling elements are mechanically coupled to the substrate via exactly one substrate connection point, in particular a centrally situated one. The coupling takes place particularly preferably via spring structures.

In this way, according to the present invention, it is advantageously possible for the inertial sensor to be particularly insensitive to bending of the substrate.

Preferably, it is provided that the inertial sensor has exactly two movable masses.

In this way, according to the present invention it is advantageously possible that the inertial sensor has masses that are less inert, and is therefore less sensitive to interference signals.

Advantageous embodiments and developments of the present invention are described herein with reference to the figures.

According to a preferred development of the present invention, it is provided that the first coupling element, the second coupling element, and the third coupling element are configured in such a way that when there is a deflection of the masses from the rest position, the first main direction of extension remains parallel to the third main direction of extension. Particularly preferably, the first coupling element is connected to one of the two masses and to the second coupling element, the third coupling element being connected to one of the two masses and to the second or to the first coupling element. Quite particularly preferably, the second coupling element is situated between the first and the second coupling element.

In this way, according to the present invention it is advantageously possible to realize a Z-shaped joint structure, whereby interference modes are effectively suppressed.

According to a preferred development, it is provided that the inertial sensor includes a fourth coupling element, the fourth coupling element having a fourth main direction of extension, the first coupling element, the second coupling element, the third coupling element, and the fourth coupling element being configured such that when there is a deflection of the masses from the rest position there occurs a pivoting of the third main direction of extension relative to the fourth main direction of extension, the first main direction of extension in particular remaining parallel to the third main direction of extension, and the second main direction of extension remaining parallel to the fourth main direction of extension. Particularly preferably, the coupling elements are configured in the shape of a rhombus, the masses being connected in particular at two opposite corners of the rhombus. A person skilled in the art will understand that in this way a rhombus-shaped coupling structure is provided.

In this way, according to the present invention it is advantageously possible that the coupling structure formed by the coupling elements can on the one hand carry out torsion movements about a center axis, and in addition parallel modes, i.e., interference modes, are largely suppressed.

According to a preferred development of the present invention, it is provided that the coupling elements have different lengths, at least one coupling element preferably having a length that is twice the length of another coupling element, and in particular these two coupling elements being connected. Particularly preferably, the coupling elements are configured and/or coupled in a cross shape and/or in the shape of a scissor joint.

In this way, according to the present invention it is advantageously possible that no undesired interference modes occur transverse to the direction of movement of the two masses. Particularly preferably, a plurality of cross-shaped coupling structures are provided, configured one after the other and correspondingly connected, so that greater distances between the masses to be coupled can advantageously also be bridged.

According to a preferred development of the present invention, it is provided that the coupling elements are connected at their center and/or at their ends to another of the coupling elements.

Here it is particularly preferably provided that a substrate connection point is provided at at least one connecting point.

In this way, according to the present invention it is advantageously possible to enable the above-described scissors-shaped and/or cross-shaped coupling structures, which are particularly robust against parallel interference modes transverse to the direction of movement of the masses. Through the central substrate connection point, it is advantageously possible for the coupling elements to be essentially mounted by a few centrally situated substrate connection points, and thus for the inertial sensor to be particularly insensitive to bending of the substrate.

According to a preferred development of the present invention, it is provided that the coupling elements are made beam-shaped, in particular as bending beams, torsion beams, and/or push-pull beams.

In this way, according to the present invention it is advantageously possible for the coupling elements to be made rigid, but to have different rigidity with regard to particular axes and/or deformations. For example, a coupling element can be rigid with regard to a torsion, but soft with regard to bending along its main direction of extension.

According to a preferred development of the present invention, it is provided that a coupling element has a variable cross-section, in particular a variable thickness, along its main direction of extension. Particularly preferably, a coupling element has a greater thickness in its center than at at least one end.

In this way, according to the present invention it is advantageously possible for the bending characteristic of the coupling element to be adjusted in a targeted manner. Thus, for example a sagging of the coupling element can be prevented, while an adequately low bending rigidity can be ensured at the connecting points, i.e., the ends, for the pivoting movements according to the present invention. In particular, in this way defined deformation points can advantageously be provided, thus improving the non-linearity characteristic of the inertial sensor.

According to a preferred development of the present invention, it is provided that the inertial sensor has at least one drive means, i.e., a driver, for driving the masses to execute a movement along a second direction, the first direction being different from the second direction.

In this way, according to the present invention it is advantageously possible that the inertial sensor is a rotational rate sensor. In particular, the masses are driven to execute a movement parallel to the second direction, the second direction being configured for example parallel to the main plane of extension. If a rate of rotation about an axis perpendicular to the main plane of extension now occurs, the masses are deflected along the first direction due to the Coriolis force, which in turn is detected by the detection means, i.e., the detector.

According to a preferred development, it is provided that the first direction and the second direction are parallel to the main plane of extension, or that the first direction is parallel to the main plane of extension and the second direction is perpendicular to the main plane of extension, or that the first direction is perpendicular to the main plane of extension and the second direction is parallel to the main plane of extension.

In this way, according to the present invention it is advantageously possible to provide a versatile inertial sensor that, in various configurations, can detect rates of rotation both in the main plane of extension and also perpendicular thereto.

Exemplary embodiments of the present invention are shown in the figures and are explained in more detail below.

BRIEF DESCRIPTION OF THE DRAWINGS

FIGS. 12a and 12b show two coupling elements according to a specific embodiment of the present invention, in a schematic detail view.

FIG. 13 shows an inertial sensor according to a specific embodiment of the present invention in a schematic view.

DETAILED DESCRIPTION OF EXAMPLE EMBODIMENTS

Figure 1:
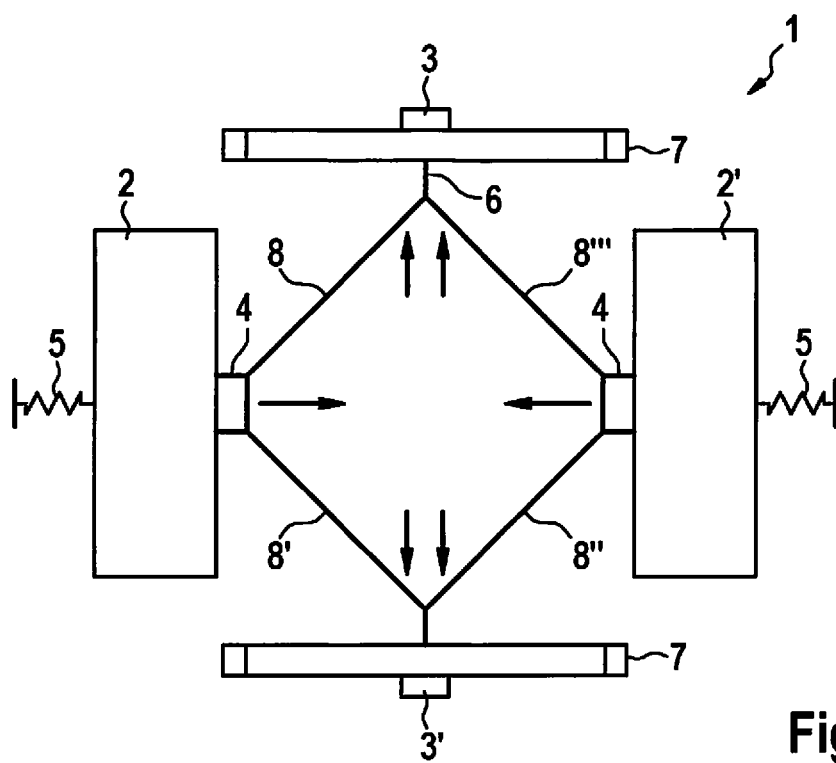
FIG. 1 shows an inertial sensor according to a specific embodiment of the present invention, in a schematic view.

In the various Figures, identical parts are always provided with the same reference characters, and are therefore as a rule each named or mentioned only once.

FIG. 1 shows an inertial sensor 1 according to a specific embodiment of the present invention, in a schematic view. Inertial sensor 1 can be a rotational rate sensor and/or an acceleration sensor. Inertial sensor 1 includes a substrate (not shown here) having a main plane of extension that is oriented parallel to the plane of the drawing. On the substrate, two masses 2, 2' are movably suspended via springs 5. Springs 5 enable for example a drive movement of masses 2, 2', as impressed on masses 2, 2' by a drive means, i.e., a driver, in a rotational rate sensor. The springs are correspondingly suitably fashioned, i.e., in particular are soft parallel to the direction of movement of masses 2, 2' and are rigid against movements perpendicular to this direction of movement. Masses 2, 2' are mechanically coupled via a coupling structure, the coupling structure being fashioned by a plurality of, here four, coupling elements 8, 8', 8", 8'", fashioned as push-pull bending beams.

First coupling element 8 has a first main direction of extension, second coupling element 8' has a second main direction of extension, third coupling element 8" has a third main direction of extension, and fourth coupling element 8'" has a fourth main direction of extension. These coupling elements 8, 8', 8", 8'" are configured in the shape of a rhombus according to the depicted specific embodiment. First coupling element 8 and second coupling element 8' are coupled to mass 2 via a connection 4, for example a suitable spring structure, and third coupling element 8" and fourth coupling element 8'" are coupled to the other mass 2' via a connection 4. At the two corners of the rhombus that are not connected to the masses 2, 2', i.e., the connecting points of the first and fourth coupling element 8, 8'", or of the second and third coupling element 8', 8", coupling elements 8, 8', 8", 8'" are coupled mechanically to the substrate via substrate connecting points 3, 3'. Here, this coupling takes place via torsion springs 6 situated at coupling elements 8, 8', 8", 8'", which enable a torsional movability of the coupling structure out of the main plane of extension, i.e., a rotation about an axis parallel to the main plane of extension.

Torsion springs 6 are in turn coupled to further springs 7, here realized as double-U springs, which in turn ensure the direct connection to the substrate at substrate connecting points 3, 3'.

The movements of the masses 2, 2' are acquired by detection means, i.e., a detector, that are however not shown here and in the following for reasons of clarity. The Figures concentrate on the novel configuration of coupling elements 8, 8', 8", 8'".

In addition, in FIG. 1 arrows are shown that symbolize the directions of movement. Thus, coupling elements 8, 8', 8", 8'" enable movement of masses 2, 2' in opposite directions, toward one another or away from one another. For the depicted case, in which masses 2, 2' move toward one another parallel to the main plane of extension, there results a movement of the coupling elements, or of the coupling structure, perpendicular to the movement of masses 2, 2', and also parallel to the main plane of extension. Such a movement is possible due to the spring-mounted connection of coupling elements 8, 8', 8", 8'".

Here, the coupling elements 8, 8', 8", 8'" are moved in such a way that the first main direction of extension is pivoted relative to the second main direction of extension and the fourth main direction of extension, and the second main direction of extension is pivoted relative to the third main direction of extension, and the third main direction of extension is pivoted relative to the fourth main direction of extension. That is, the angles enclosed between the named main directions of extension change. In contrast, the first main direction of extension and the third main direction of extension remain parallel to one another, and the second main direction of extension and the third main direction of extension also remain parallel to one another.

Figure 2:
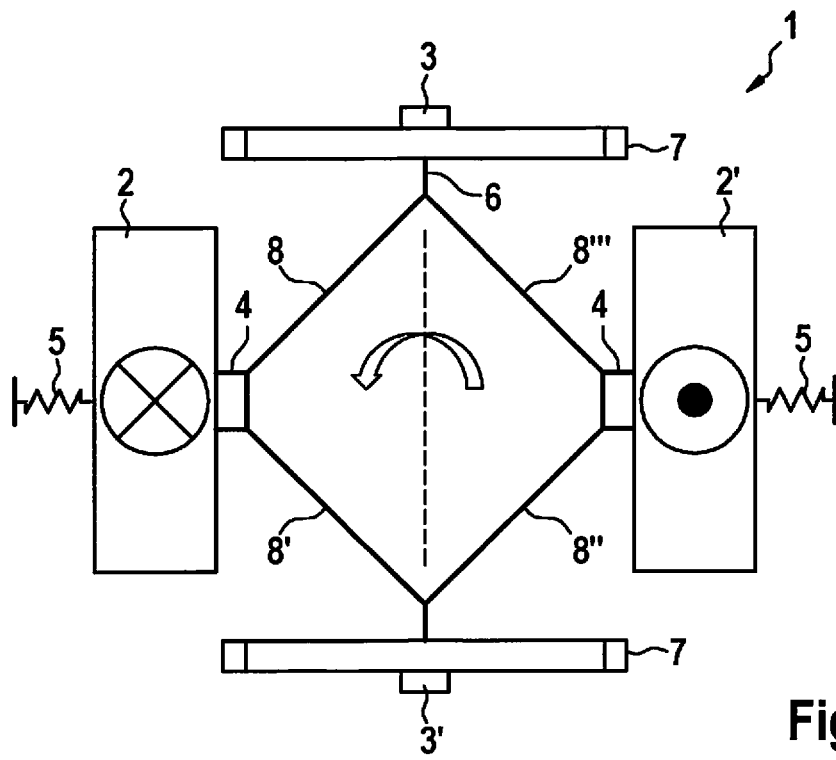
FIG. 2 shows an inertial sensor according to a specific embodiment of the present invention, in a schematic view.

FIG. 2 shows an inertial sensor 1 according to a specific embodiment of the present invention, in a schematic view. Here, the depicted specific embodiment corresponds essentially to the specific embodiment shown in FIG. 1, for which reason reference is made to the statements relating to that specific embodiment. On the basis of torsion springs 6, masses 2, 2' and the coupling structure, i.e. coupling elements 8, 8', 8", 8'", can also execute torsion movements about the axis shown in a dashed line, which is configured parallel to the main plane of extension. The torsion movement takes place here in such a way that the right mass 2' is moved out of the plane of the figure, while left mass 2 is moved into the plane of the figure.

Figure 3:
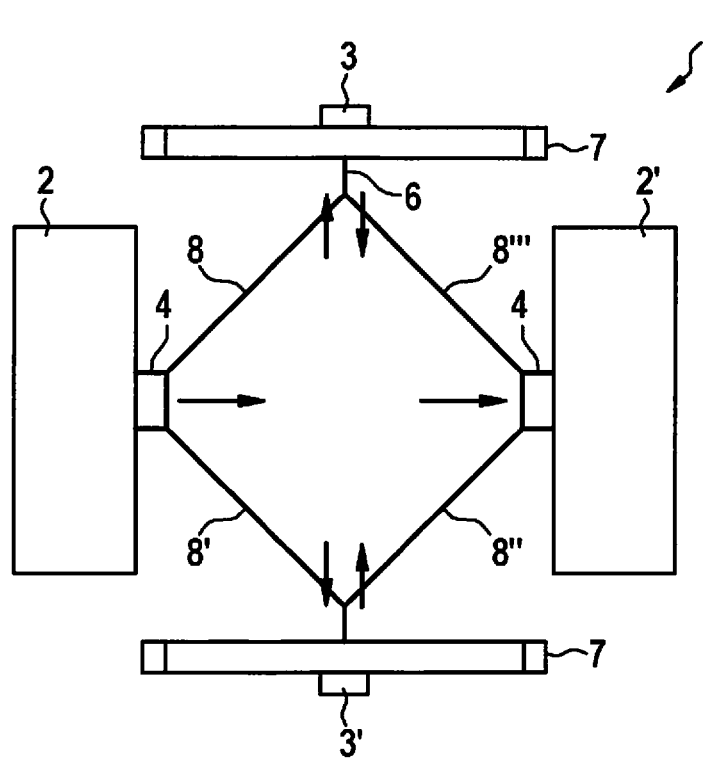
FIG. 3 shows an inertial sensor according to a specific embodiment of the present invention, in a schematic view.

FIG. 3 shows an inertial sensor 1 according to a specific embodiment of the present invention, in a schematic view. Here, the depicted specific embodiment corresponds essentially to the specific embodiments shown in FIGS. 1 and 2, for which reason reference is made to the statements relating to those specific embodiments. Here it is shown as an example how, when a cross-acceleration is present, a parallel interference mode is suppressed through the configuration of coupling elements 8, 8', 8", 8'".

Figure 4:
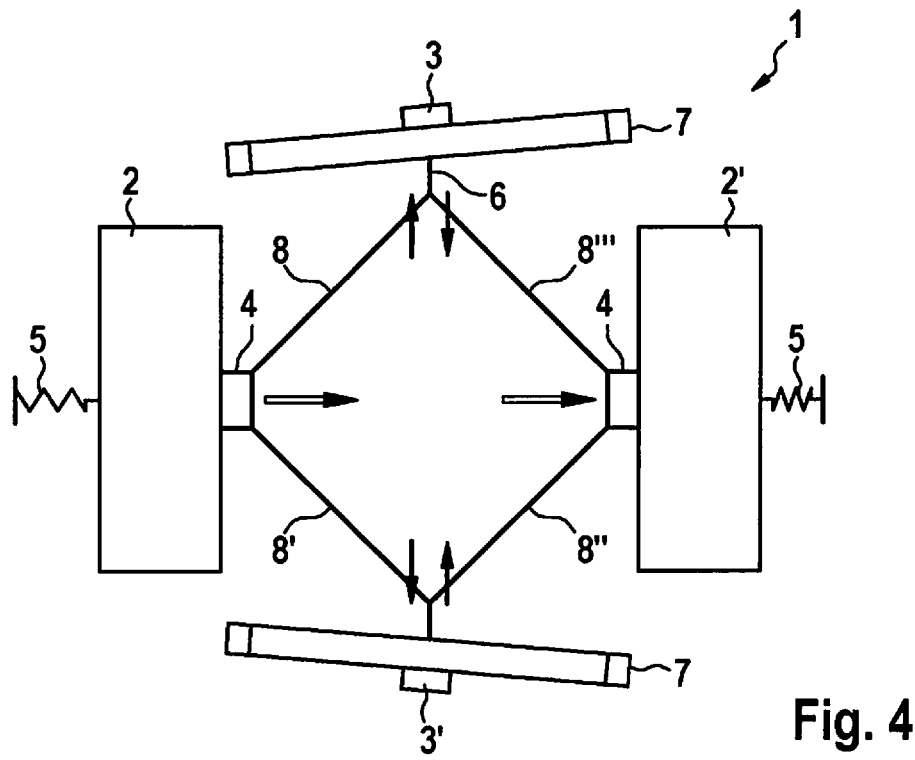
FIG. 4 shows an inertial sensor according to a specific embodiment of the present invention, in a schematic view.

FIG. 4 shows an inertial sensor 1 according to a specific embodiment of the present invention, in a schematic view. Here, the depicted specific embodiment corresponds essentially to the specific embodiments shown in FIGS. 1 through 3, for which reason reference is made to the statements relating to those specific embodiments. If the cross-accelerations here are very large, this can cause tilting of the double-U springs 7, as shown, and as a result the parallel interference mode is no longer suppressed as effectively.

Figure 5:
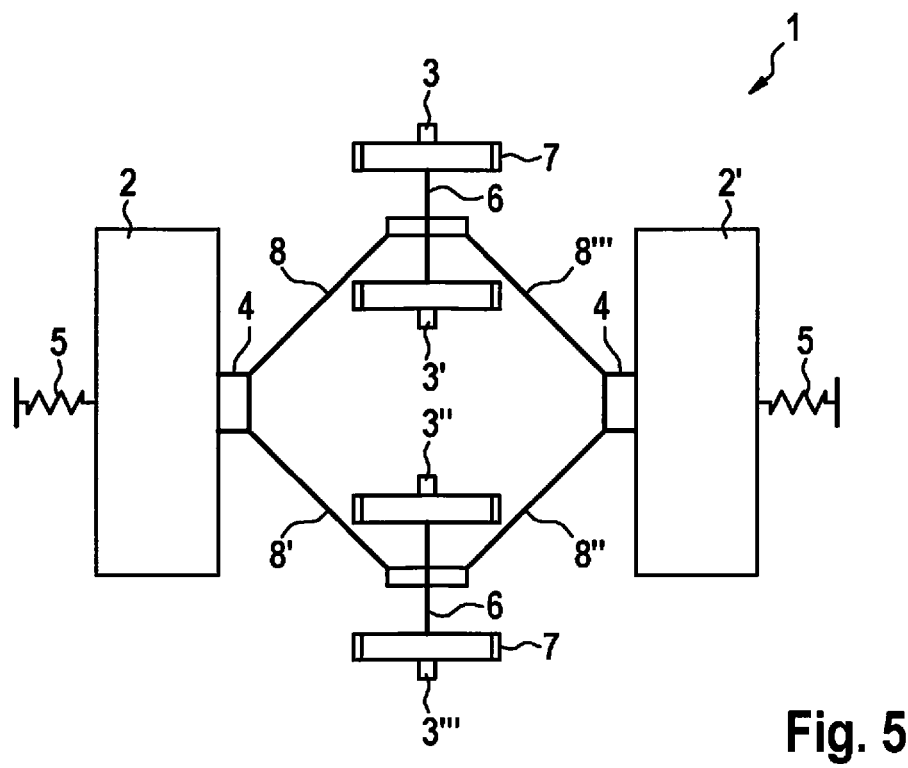
FIG. 5 shows an inertial sensor according to a specific embodiment of the present invention, in a schematic view.

FIG. 5 shows an inertial sensor 1 according to a specific embodiment of the present invention, in a schematic view. Here, the depicted specific embodiment corresponds essentially to the specific embodiments shown in FIGS. 1 through 4, for which reason reference is made to the statements relating to those specific embodiments. In order to improve the suppression of (parallel) interference modes, inertial sensor 1 according to the specific embodiment shown here has four substrate connecting points 3, 3', 3", 3'" for coupling elements 8, 8', 8", 8'". These connecting points are configured essentially symmetrically and are realized as described above, i.e., the substrate connection takes place in each case via a double-U spring 7, which in turn is connected to coupling elements 8, 8', 8", 8'" via a torsion spring 6. In this way, the rigidity of the coupling structure is increased, and a tilting of springs 7 as in FIG. 4 is avoided.

Figure 6:
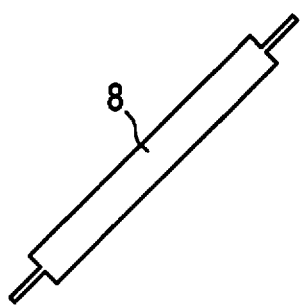
FIG. 6 shows a coupling element according to a specific embodiment of the present invention, in a schematic view.

FIG. 6 shows a coupling element 8 according to a specific embodiment of the present invention, in a schematic view. As in the previously described specific embodiments, coupling element 8 is realized as a push-pull bending beam. However, in order to prevent bending of coupling element 8, coupling element 8 is made such that it has a larger thickness in the center relative to the main direction of extension, i.e., it has a broader cross-section. In this way, bending is prevented during push loading. Due to the fact that at the same time the ends of coupling element 8 at which coupling element 8 is connected to other coupling elements 8', 8'" are made thin compared to the center, the coupling structure is prevented from becoming too stiff. This is important in order to influence the non-linearity characteristic of inertial sensor 1 in a controlled manner. A rhombus-shaped coupling structure of coupling elements 8, 8', 8", 8'", as shown, thus has overall a more pronounced non-linear characteristic than does a conventional U-shaped spring.

In this way, the cross-section of coupling elements 8, 8', 8", 8'" can be adapted as a function of the desired useful mode frequencies, or the undesired interference mode frequencies, in the particular case of application. It is also possible for coupling elements 8, 8', 8", 8'" to be relatively soft, and to provide the rigidity required for the desired useful mode frequency via the remaining springs 6, 7 of inertial sensor 1.

Figure 7A:
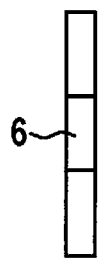
FIGS. 7a and 7b show a torsion spring for connecting a coupling element to a substrate connecting point according to a specific embodiment of the present invention, in a schematic view from below and in a schematic side view.
Figure 7B:
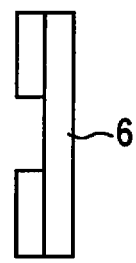

FIGS. 7a and 7b show a torsion spring 6 for connecting a coupling element 8, 8', 8", 8''' to a substrate connecting point 3, 3' according to a specific embodiment of the present invention, in a schematic view from below and in a schematic side view. FIG. 7a shows the schematic view from below. As stated with regard to FIG. 6, it is critically important to set the rigidity of the various elements of the inertial sensor 1 in an appropriate manner. The torsional rigidity of torsion springs 6 can be controlled via the selection of their cross-sections, similar to the above-explained bending rigidity of coupling elements 8, 8', 8", 8'''.

Torsion spring 6 is here realized as a torsion beam. The torsional rigidity is influenced via a suitable choice of the dimensions of the torsion beam. Standardly, inertial sensors 1 are produced in layer processes. A one-layer process can produce only a particular constant cross-section. In the case of a multilayer process, however, it is possible, as shown and clearly seen in particular in FIG. 7b, to provide a recess in the center of the torsion beam, thereby reducing the torsional rigidity.

Figure 8:
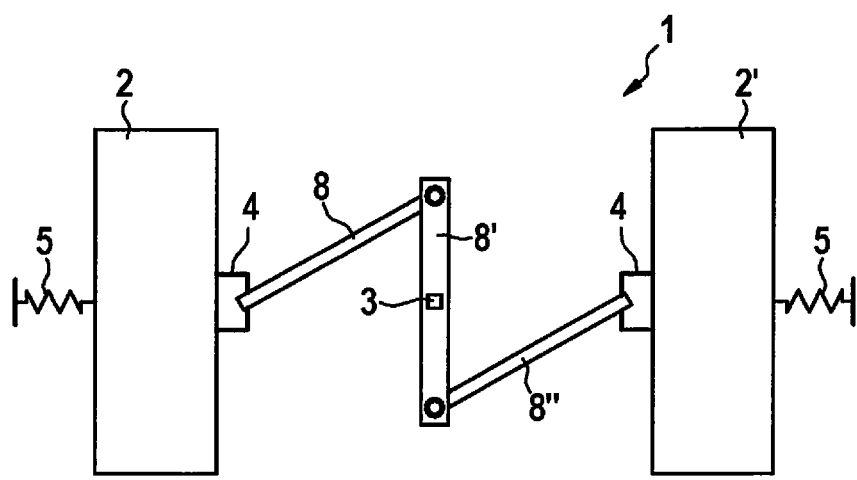
FIG. 8 shows an inertial sensor according to a specific embodiment of the present invention in a schematic view.

FIG. 8 shows an inertial sensor 1 according to a specific embodiment of the present invention, in a schematic view. Here the depicted specific embodiment corresponds substantially to the specific embodiments shown in FIGS. 1 through 4, for which reason reference is made to the statements regarding those specific embodiments. Here, however, only three coupling elements 8, 8', 8" are provided, the first coupling element 8 being connected at one end to mass 2 directly or via deflecting structures 11, and being connected at the other end to second coupling element 8'. This second coupling element has in its center a substrate connecting point 3, and is connected to third coupling element 8" at the end that is situated opposite the end provided for connection to first coupling element 8. Third coupling element 8" is in turn connected directly or indirectly, at the other end, to the other mass 2'.

Thus, the coupling structure is realized essentially having a Z shape. The connection between the coupling elements 8, 8', 8" is realized in the form of a joint. This requires in particular a multilayer process in the production of inertial sensor 1. When masses 2, 2' are deflected from a rest position, the first main direction of extension of first coupling element 8 is pivoted relative to the second main direction of extension of second coupling element 8'. Likewise, the second main direction of extension is pivoted relative to the third main direction of extension of third coupling element 8". Again, the first main direction of extension and the third main direction of extension here remain configured parallel to one another.

Due to the fact that only one centrally situated substrate connecting point is provided, inertial sensor 1 according to the depicted specific embodiment is particularly insensitive to substrate bending.

Figure 9:
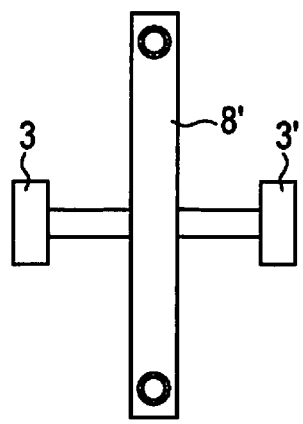
FIG. 9 shows a coupling element having a substrate connection according to a specific embodiment of the present invention in a schematic view.

FIG. 9 shows a coupling element 8' having a substrate connection 3 according to a specific embodiment of the present invention, in a schematic view. Here, the depicted specific embodiment corresponds essentially to the specific embodiment shown in FIG. 8, for which reason reference is made to the statements relating to that specific embodiment. Here, second coupling element 8' is shown, but, differing from the specific embodiment shown in FIG. 8, two substrate connecting points 3, 3' are provided. Due to the fact that they are provided so as to be symmetrical and centered relative to the overall structure, inertial sensor 1 is advantageously still largely insensitive to substrate bending, but the coupling structure is connected more stably.

Figure 10:
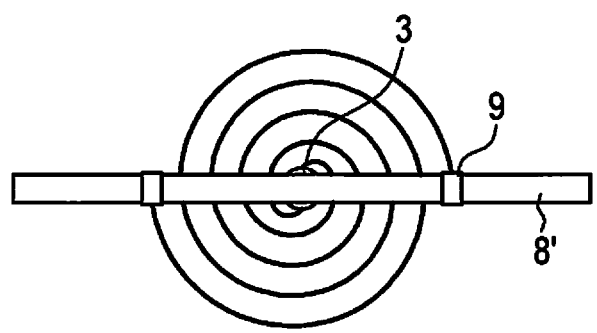
FIG. 10 shows a coupling element having a substrate connection according to a specific embodiment of the present invention in a schematic view.

FIG. 10 shows a coupling element 8' having a substrate connection 3 according to a specific embodiment of the present invention, in a schematic view. Here, the depicted specific embodiment corresponds essentially to the specific embodiment shown in FIG. 8, for which reason reference is made to the statements relating to that specific embodiment. Here, only one substrate connecting point 3 is provided, but, due to the (multi-) layer production process, an intermediate layer 9 is required that acts as a connection between the spiral-shaped spring that mediates the connection to the substrate and second coupling element 8'.

Figure 11:
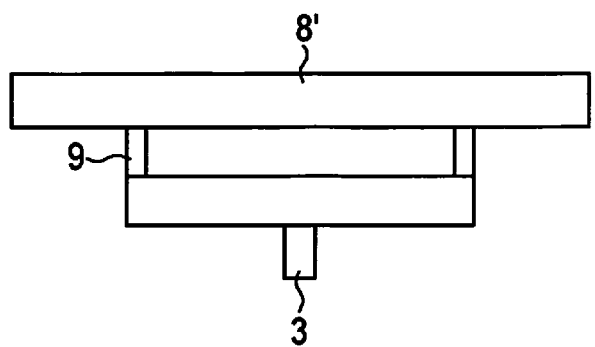
FIG. 11 shows the coupling element with the substrate connection of FIG. 10, in a side view.

FIG. 11 shows coupling element 8' with substrate connection 3 of FIG. 10, in a side view. Here, in particular intermediate layer 9 can be seen clearly, as can the layer construction of substrate connecting point 3 and second coupling element 8'.

FIGS. 12a and 12b show two coupling elements 8, 8' according to a specific embodiment of the present invention, in a schematic detail view. Here, the depicted specific embodiment corresponds essentially to the specific embodiment shown in FIG. 8, for which reason reference is made to the statements relating to that specific embodiment. Here the connection shown in FIG. 8 between first coupling element 8 and second coupling element 8' is shown in detail. In FIG. 12a, for clarity first coupling element 8 and second coupling element 8' are shown at a distance from one another. Joint segments 10, 10', having sickle-shaped curvatures, can be seen clearly. Due to the underlying layer process, these joint segments 10, 10' are fixedly connected, as shown in FIG. 12b, by an intermediate layer 9 that correspondingly acts as connecting layer. As a result, a defined hinge-type joint movement is enabled.

FIG. 13 shows an inertial sensor 1 according to a specific embodiment of the present invention, in a schematic view. Here, six coupling elements 8, 8', 8", 8''', 8'''', 8''''' are configured in the shape of a cross, so that a telescope joint is realized. Thus, this specific embodiment essentially corresponds to the specific embodiment of FIG. 1, having a rhombus-shaped coupling structure. Here, however, at the point of intersection of third coupling element 8" with fourth coupling element 8''' a substrate connecting point 3 is centrally provided. Third coupling element 8" and fourth coupling element 8''' are here made twice as long as first coupling element 8, second coupling element 8', fifth coupling element 8'''', and sixth coupling element 8'''''. The coupling structure, and thus also inertial sensor 1, is made essentially symmetrical. Through the depicted specific embodiment, in particular undesired forces perpendicular to the direction of movement of masses 2, 2' are effectively suppressed.

Figure 14:
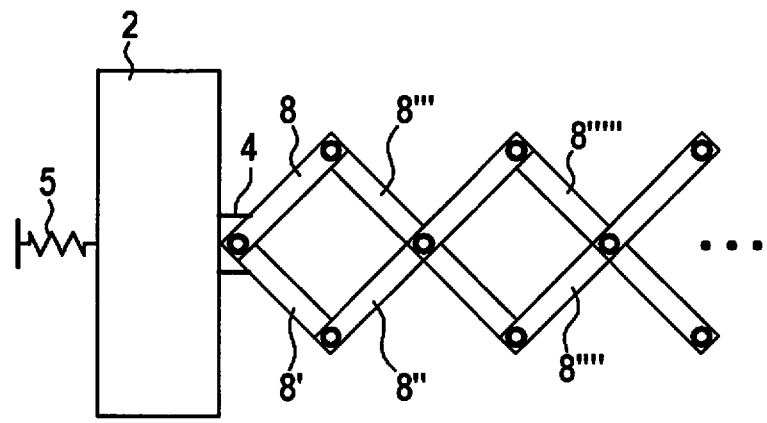
FIG. 14 shows a part of an inertial sensor according to a specific embodiment of the present invention in a schematic view.

FIG. 14 shows a part of an inertial sensor 1 according to a specific embodiment of the present invention, in a schematic view. Here, the depicted specific embodiment corresponds essentially to the specific embodiment shown in FIG. 13, for which reason reference is made to the statements relating to that specific embodiment. Here, the coupling structure is made longer through the addition of further coupling elements 8'''', 8'''''. Through such a connecting together of cross-shaped coupling structures, or coupling elements 8, 8', 8", 8''', 8'''', 8''''', larger distances between the masses 2, 2' that are to be coupled can advantageously be bridged. Here, only one substrate connection point 3 is shown, but of course more substrate connecting points 3, 3' can be provided in the case of larger structures.

Figure 15:
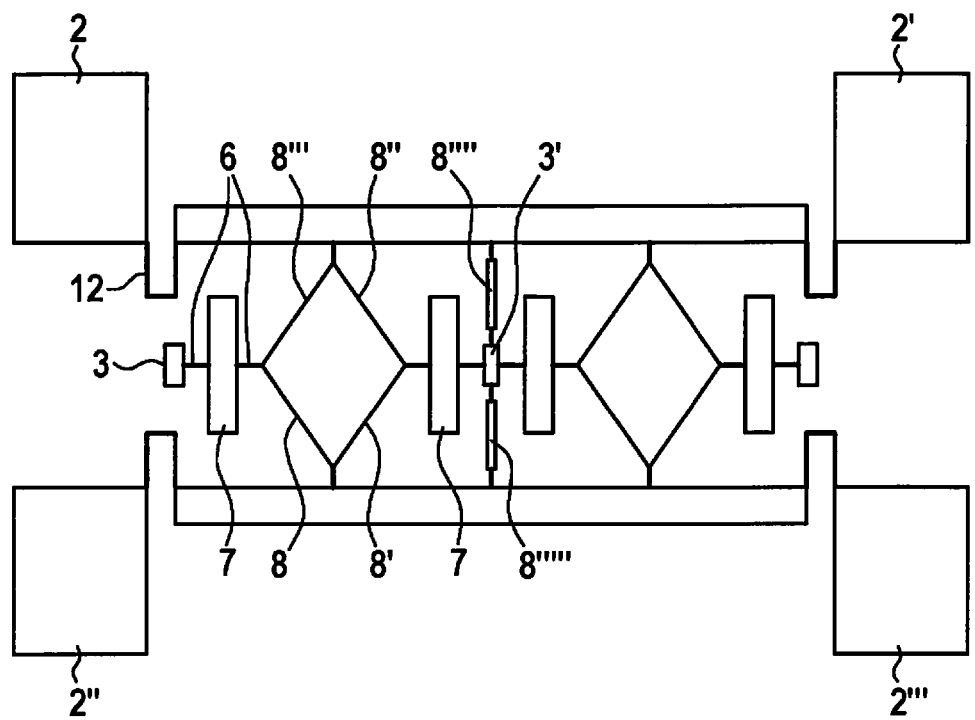
FIG. 15 shows an inertial sensor according to a specific embodiment of the present invention in a schematic view.

FIG. 15 shows an inertial sensor 1 according to a specific embodiment of the present invention, in a schematic view. Here, inertial sensor 1 includes four masses 2, 2', 2", 2'". In order to enable maintenance of the coupling structure according to the present invention, or the configuration according to the present invention of coupling elements 8, 8', 8", 8'", the masses are coupled to coupling elements 8, 8' 8", 8'" indirectly via a deflecting structure 11 that is as rigid as possible and U-shaped springs 12. Because the design of inertial sensor 1 is essentially symmetrical, for simplicity only the left side of the structure is explained below.

The left half of the structure corresponds essentially to the specific embodiment shown in FIG. 1, with the difference that the coupling of the masses 2, 2', 2", 2'" takes place indirectly via deflecting structure 11. Otherwise, the configuration of coupling elements 8, 8', 8", 8'" corresponds essentially to the configuration shown in FIG. 1, but in the present depiction is rotated by 90° relative thereto. Again, coupling elements 8, 8', 8", 8'" are connected to the substrate via two substrate connecting points 3, 3'. As described above, the connection to substrate connecting points 3, 3' here takes place via torsion springs 6 and double-U springs 7.

For additional stabilization, and for the suppression of parallel interference modes for the case in which the two upper masses 2, 2' and the two lower masses 2", 2'" move in opposite directions perpendicular to the main plane of extension, the center substrate connecting point 3' is additionally connected to deflecting structure 11 via further coupling elements 8'"", 8'"".

Figure 16:
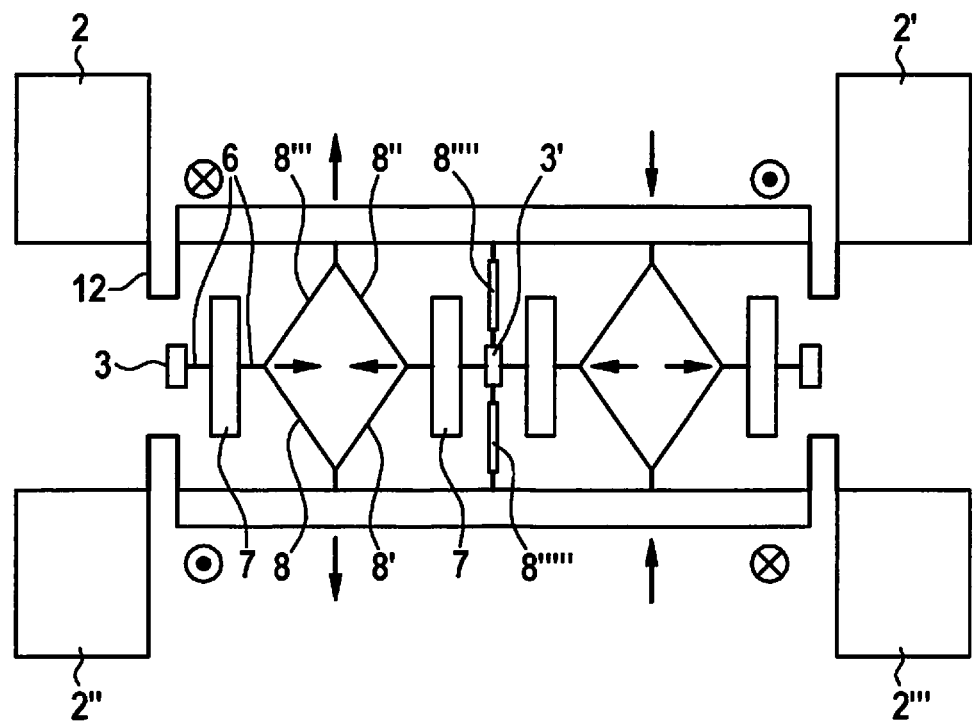
FIG. 16 shows an inertial sensor according to a specific embodiment of the present invention in a schematic view.

FIG. 16 shows an inertial sensor 1 according to a specific embodiment of the present invention in a schematic view. Here, the depicted specific embodiment corresponds essentially to the specific embodiment shown in FIG. 16, for which reason reference is made to the statements made relating to that specific embodiment. Here the types of movement that are possible with an inertial sensor 1 according to the depicted specific embodiment are shown. In particular, operation as a rotational rate sensor is shown, with movements, compelled by drive means (i.e., a detector, not shown), parallel to the main plane of extension, and resulting movements, detected by detection means (i.e., a detector, also not shown) perpendicular to the main plane of extension. The depicted specific embodiment is particularly advantageous because in addition a parallel interference mode is suppressed in which the left upper mass 2 and the left lower mass 2" move in a different direction than do the other two masses 2', 2'".

Figure 17:
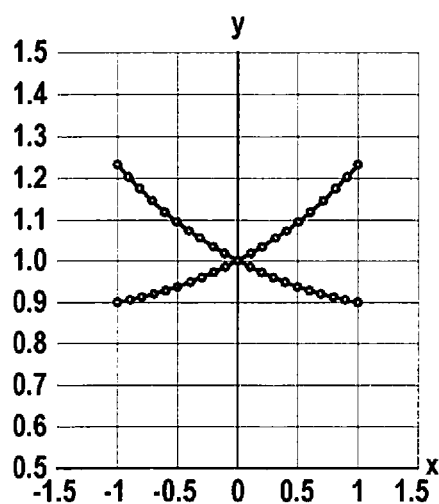
FIG. 17 shows an example of a curve of a spring rigidity of coupling elements according to a specific embodiment of the present invention.

FIG. 17 shows an example of the curve of a spring rigidity of coupling elements 8, 8', 8", 8'" according to a specific embodiment of the present invention. Here, in particular the spring rigidity of two rhombus-shaped coupling structures, as depicted in FIGS. 15 and 16, is shown. Each curve represents the spring rigidity of a rhombus-shaped configuration of coupling elements 8, 8', 8", 8'". It will be seen immediately that the spring rigidities have a non-linear curve. The lower regions of the curve correspond to push loading and the upper regions correspond to pull loading. In the case of pull loading, such a rhombus-shaped coupling structure becomes more rigid, while it becomes softer in the case of a compression, i.e. a push load. Here the units are chosen arbitrarily.

Figure 18:
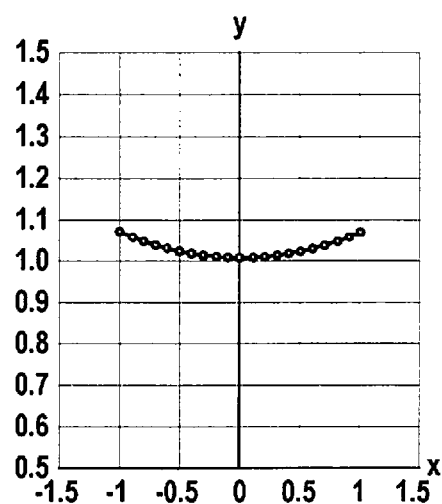
FIG. 18 shows an example of a curve of a spring rigidity of coupling elements according to a specific embodiment of the present invention.

FIG. 18 shows an example of a curve of a spring rigidity of coupling elements 8, 8', 8", 8'" according to a specific embodiment of the present invention. The depicted curve corresponds to the superposition of the curves of FIG. 17. Comparison to the curves of FIG. 17 shows a compensation effect with regard to the non-linearity. Again, the units are selected arbitrarily. In comparison to the individual curves of FIG. 17, it can be seen that the slope of the overall spring rigidity of the coupling structure is smaller by approximately a factor of 4 than the slopes of the spring rigidities of the individual rhombus-shaped coupling structures.

What is claimed is:

1. A microelectromechanical one-axis inertial sensor for measuring a rate of rotation and/or acceleration, the inertial sensor comprising:
    a substrate having a main plane of extension;
    at least two masses that can be deflected from a rest position, the masses being coupled mechanically to the substrate; and
    at least one detector configured to detect movements of the masses along a first direction;
    wherein the masses are mechanically coupled to one another by at least one first coupling element, a second coupling element, and a third coupling element, the first coupling element having a first main direction of extension, the second coupling element having a second main direction of extension, the third coupling element having a third main direction of extension, the first main direction of extension, the second main direction of extension, and the third main direction of extension, in the rest position, being parallel to the main plane of extension;
    wherein the first coupling element, the second coupling element, and the third coupling element are rigid in at least one direction;
    wherein each coupling element of the first, second, and third coupling elements being connected with at least one other of the first, second, and third coupling elements;
    wherein the first, second, and third coupling elements are configured in such a way that when there is a deflection of the masses from the rest position a pivoting of the first main direction of extension relative to the second main direction of extension takes place, and a pivoting of the second main direction of extension relative to the third main direction of extension takes place; and
    wherein the coupling elements are coupled mechanically to the substrate via at least one substrate connecting point,
    wherein the one-axis inertial sensor is configured to measure a rate of rotation about exactly one axis or configured to measure acceleration along exactly one axis.

2. The inertial sensor as recited in claim 1, wherein the first coupling element, the second coupling element, and the third coupling element are configured in such a way that when there is a deflection of the masses from the rest position, the first main direction of extension remains parallel to the third main direction of extension.

3. The inertial sensor as recited in claim 1, further comprising:
    a fourth coupling element having a fourth main direction of extension, the first coupling element, the second coupling element, the third coupling element, and the fourth coupling element being configured in such a way that when there is a deflection of the masses from the rest position a pivoting of the third main direction of extension relative to the fourth main direction of extension takes place, the first main direction of extension remaining parallel to the third main direction of extension, and the second main direction of extension remaining parallel to the fourth main direction of extension.

4. The inertial sensor as recited in claim 1, wherein the first, second, and third coupling elements have different lengths, one coupling element of the first, second, and third coupling elements having a length twice as large as that of another coupling element of the first, second, and third coupling elements, the one coupling element and the another coupling element being connected.

5. The inertial sensor as recited in claim 1, wherein the first, second, and third coupling elements are connected at their center and/or at their ends to another of the first, second, and third coupling elements.

6. The inertial sensor as recited in claim 1, wherein the first, second, and third coupling elements have a beam shape, the first, second, and third coupling elements being bending beams, torsion beams, and/or push-pull beams.

7. The inertial sensor as recited claim 1, wherein at least one of the first, second, and third coupling elements has a varying thickness along its main direction of extension.

8. The inertial sensor as recited in claim 1, wherein the first, second, and third coupling elements are coupled to the substrate mechanically via exactly one substrate connecting point.

9. The inertial sensor as recited in claim 1, wherein the inertial sensor has at least one driver configured to drive the masses to execute a movement along a second direction, the first direction being different from the second direction.

10. The inertial sensor as recited in claim 9, wherein:

(i) the first direction and the second direction are parallel to the main plane of extension, or (ii) the first direction is parallel to the main plane of extension and the second direction is perpendicular to the main plane of extension, or (iii) the first direction is perpendicular to the main plane of extension and the second direction is parallel to the main plane of extension.

\* \* \* \* \*